US010255589B1

(12) United States Patent
Petruzzi et al.

(10) Patent No.: US 10,255,589 B1
(45) Date of Patent: Apr. 9, 2019

(54) ACCESS CONTROLS FOR TRANSFER TRANSACTIONS

(71) Applicant: Wells Fargo Bank, N.A., San Francisco, CA (US)

(72) Inventors: Vincent Petruzzi, Maple Grove, MN (US); Andrew G. Foote, San Fancisco, CA (US); David Hatch, Daly City, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 620 days.

(21) Appl. No.: 14/921,173

(22) Filed: Oct. 23, 2015

(51) Int. Cl.
G06Q 40/00 (2012.01)
G06Q 20/10 (2012.01)
G06Q 20/40 (2012.01)

(52) U.S. Cl.
CPC ............. *G06Q 20/10* (2013.01); *G06Q 20/40* (2013.01)

(58) Field of Classification Search
CPC ......... G06Q 20/10; G06Q 20/40; G06Q 40/00
See application file for complete search history.

(56) References Cited

U.S. PATENT DOCUMENTS

| 5,326,960 | A | 7/1994 | Tannenbaum |
| 7,890,425 | B2 | 2/2011 | Stanley |
| 8,190,527 | B2 | 5/2012 | Stanley |
| 8,751,397 | B2 | 6/2014 | Stanley |
| 9,836,741 | B2 * | 12/2017 | Varadarajan ....... G06Q 20/3829 |
| 2006/0038004 | A1 * | 2/2006 | Rielly ................ G06Q 20/1085 235/379 |
| 2007/0045395 | A1 * | 3/2007 | Corona ................... G06Q 20/10 235/379 |
| 2011/0238573 | A1 * | 9/2011 | Varadarajan ....... G06Q 20/1085 705/43 |
| 2013/0124855 | A1 * | 5/2013 | Varadarajan ....... G06Q 20/3276 713/155 |
| 2014/0201075 | A1 * | 7/2014 | King .................. G06O 20/3278 705/43 |
| 2014/0244500 | A1 * | 8/2014 | Elias ..................... G06Q 20/00 705/43 |
| 2015/0088746 | A1 * | 3/2015 | Hoffman .......... G06Q 20/40145 705/44 |
| 2016/0019537 | A1 * | 1/2016 | Raja ..................... G06O 20/385 705/43 |
| 2016/0078430 | A1 * | 3/2016 | Douglas ............. G06Q 30/0185 705/43 |

(Continued)

OTHER PUBLICATIONS

Banque Partners with Diebold to Launch Cardless Transaction Solution, Wireless News: NA. (Dec. 31, 2014).*

*Primary Examiner* — Lalita M Hamilton
(74) *Attorney, Agent, or Firm* — Schwegman Lundberg & Woessner, P.A.

(57) ABSTRACT

Access controls for transferring funds from a customer to a designated recipient using a transaction machine and a one-time account and/or an authentication process that does not involve the use of a transaction card are disclosed. An example method (and system) can include storing identification data associated with a one-time account or transfer for the designated recipient of the one-time account; receiving authentication data from the transaction machine; determining that the user corresponds to the designated recipient using the received authentication data and the stored identification data; and executing the selected transaction after the determination.

14 Claims, 4 Drawing Sheets

(56) References Cited

U.S. PATENT DOCUMENTS

| | | | | |
|---|---|---|---|---|
| 2016/0162889 A1* | 6/2016 | Badenhorst | ............ | G06Q 20/32 705/44 |
| 2016/0358139 A1* | 12/2016 | Keys | .................. | G06Q 20/1085 |
| 2017/0124544 A1* | 5/2017 | Recriwal | ............ | G06Q 20/1085 |

* cited by examiner

ACCESS CONTROLS FOR TRANSFER TRANSACTIONS

TECHNICAL FIELD

Embodiments described herein generally relate to access controls for transfer transactions using, for example and without limitation, one-time accounts, automated teller machines (ATM) and mobile applications.

BACKGROUND

Financial institutions provide various ways for customers to perform transactions. This includes using automated teller machines (ATMs), desktop and laptop computers, tablets and mobile phones and the like (collectively "transaction machines"). ATMs are typically located at a variety of geographic locations and provide a convenient way for a use to obtain cash. ATMs allow a user to insert a transaction card such as a debit card and a personal identification number to obtain access to account information. Mobile applications residing on tablets or phones are not tied to a particular geographic location and provide a convenient interface for users to access account information and schedule transactions including paying another person or entity.

BRIEF DESCRIPTION OF THE SEVERAL VIEWS OF THE DRAWINGS

In the drawings, which are not necessarily drawn to scale, like numerals can describe similar components in different views. Like numerals having different letter suffixes can represent different instances of similar components. Some embodiments are illustrated by way of example, and not of limitation, in the figures of the accompanying drawings, in which.

DETAILED DESCRIPTION

Systems are described herein that can enable a customer to more conveniently transfer funds to a recipient in a safe and personal manner. Example systems disclosed herein allow a customer to establish a one-time account for a recipient and allow for a fund transfer from the one-time account to the recipient without the recipient providing his or her primary account or routing information. One-time accounts are different than primary bank accounts and are closed after the funds in the one-time account have been transferred. The use of one-time accounts can avoid the need to share primary account and routing information with others and can reduce the risk of fraud and provide an additional level of security. The one-time account can be accessed by a recipient using a transaction card (e.g., an ATM or debit card or special purpose card typically storing information on a magnetic stripe) or through an authentication process that does not require a transaction card. For convenience, we refer to the person or entity that is transferring funds or setting up a one-time account as the customer and we refer to the recipient of the funds as the recipient or user.

Systems are described herein that can enable the withdrawal of cash from an ATM using a shared secret authentication process that does not require the use of a transaction card. Example shared secret authentication processes include using shared knowledge known to the customer and recipient such as pictures, social media entries (e.g., pictures, profiles, etc.), passwords, mobile phone numbers, birthdays, etc. or using approval by the customer providing the funds (e.g., through the ATM taking a picture of the ATM user/recipient, sending the picture to the customer and obtaining the customer's approval). By overcoming the technical challenge of needing a transaction card to make a withdrawal, the systems can, for example, allow a simple and safe way for a customer to easily provide cash to recipients such as children, family or friends directly from the customer's account for an emergency or other reasons at a location that is easily accessible by the recipient. This not only can improve security but can increase convenience as well.

Example systems can also allow a customer to establish rules governing a transaction or a one-time account, such as specifying when and/or where a transfer can happen and what good(s) can be purchased or which merchant(s) can be used for the funds. The systems can, for example, allow a customer to identify a particular ATM for a transfer. Systems can also allow a customer to set a particular time period during which a transfer can be performed. This can provide increased safety especially when a customer desires to provide a recipient with cash from an ATM. These and other aspects of the example systems are discussed in more detail below.

Figure 1:
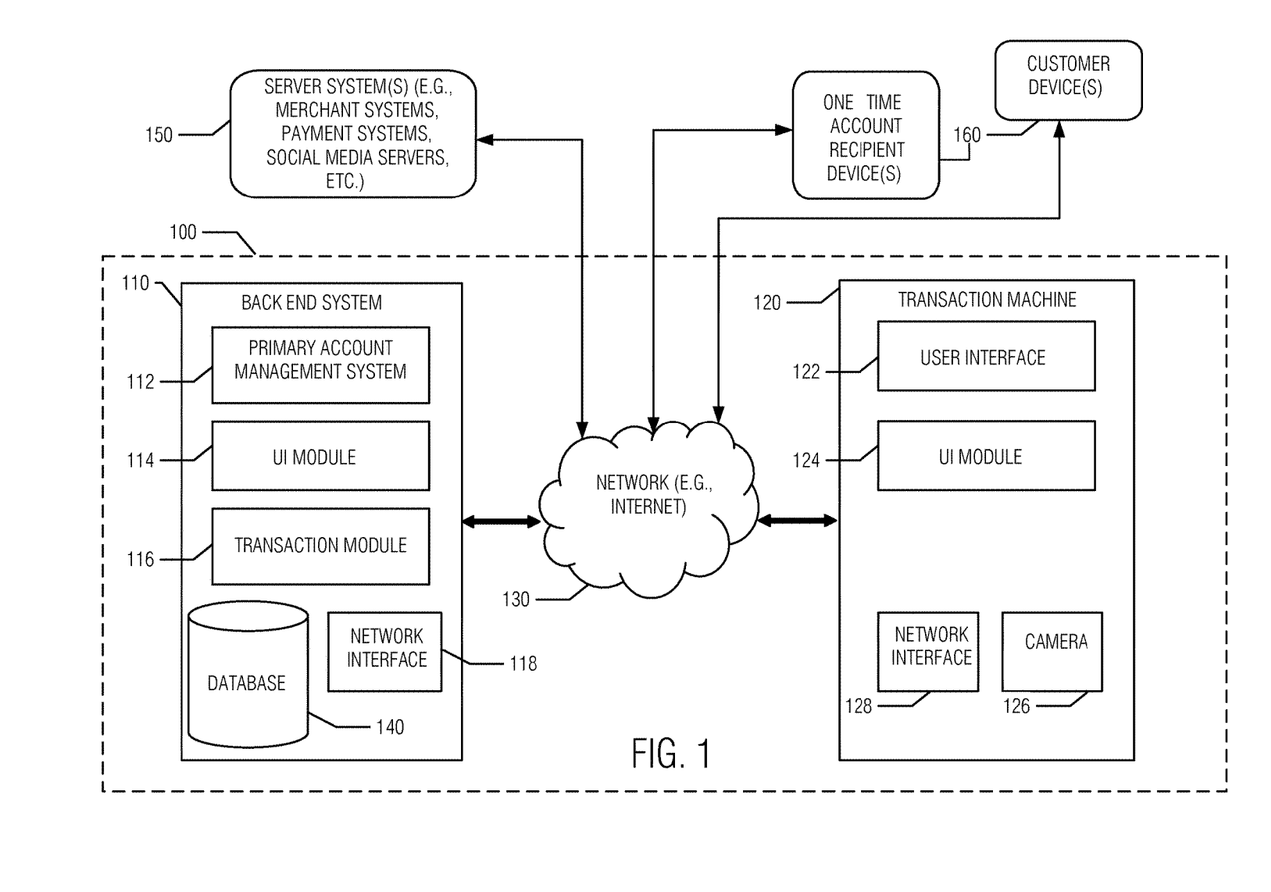
FIG. 1. illustrates a schematic diagram of a system, according to various examples.

FIG. 1. illustrates a schematic diagram of system 100. System 100 is illustrated as including back end system 110 and a transaction machine 120. The back end system includes a primary account management system 112 which manages the primary accounts of customers. The primary account management system 112 can, for example, allow users to establish accounts, modify account settings and perform financial transactions. The components of the back end system 110 can be in a single geographic location or in a diverse set of locations.

The transaction machine 120 can be any type of device capable of initiating a financial transaction including, for example, an ATM, a desktop or laptop computer, a mobile phone or tablet. The transaction machine 120 includes a user interface 122 capable of receiving inputs from a user and presenting information to a user under control of a UI module 124. The UI module 124 can cooperate with the user interface module 114 of the back end system 110 to present information to a user. The transaction machine 120 can further include or be in communication with a camera 126 for taking pictures and video.

The back end system 110 includes a transaction module 116 capable of handling one-time accounts and/or authentication that can be done without the need for a transaction card as will be discussed in detail below. The transaction module 116 can, for example, allow a customer to create a one-time account for a designated recipient and/or establish an authentication process for initiating a transfer. The transaction module 116 can, for example, allow a customer to establish rules governing the use of the funds or the timing and location of a transfer of funds to a recipient.

While the transaction module 116 is shown as part of the back end system 110, it can in other embodiments, reside on the transaction machine 120 or reside in part on the back end system 110 and in part on the transaction machine 120. The transaction module 120 can also include various sub modules for carrying out the processes described herein. The sub modules can reside on the back end system and/or the transaction machine.

The back end system 110 and transaction machine 120 can, for example, communicate via one or more networks such as the network 130 using network interfaces 118, 128. The network 130 can include local-area networks (LAN), wide-area networks (WAN), wireless networks (e.g., 802.11 or cellular network), the Public Switched Telephone Network (PSTN) network, ad hoc networks, cellular, personal area networks or peer-to-peer (e.g., Bluetooth®, Wi-Fi Direct), or other combinations or permutations of network protocols and network types. The network 130 can include a single local area network (LAN) or wide-area network (WAN), or combinations of LAN's or WAN's, such as the Internet.

Data used in the system 100 can be organized and stored in a variety of manners. For convenience, the organized collection of data is described herein as the database 140. The specific storage layout and model used in database 140 can take a number of forms—indeed, database 140 can utilize multiple models. The database 140 can be, but is not limited to, a relational database (e.g., SQL), non-relational database (NoSQL) a flat file database, object model, document details model, or a file system hierarchy. The database 140 can store data on one or more storage devices (e.g., a hard disk, random access memory (RAM), etc.). The storage devices can be in standalone arrays, part of one or more servers, and can be located in one or more geographic areas. The database 140 can be part of or separate from the back end system 110.

The system 100 can also send and receive information from server systems 150 including merchant systems, payment systems and social media servers and client devices 160 (e.g., mobile phones or other computer systems) such as those of a customer or recipient of funds from the customer. Communication between these systems can also take place over network 130.

Figure 2:
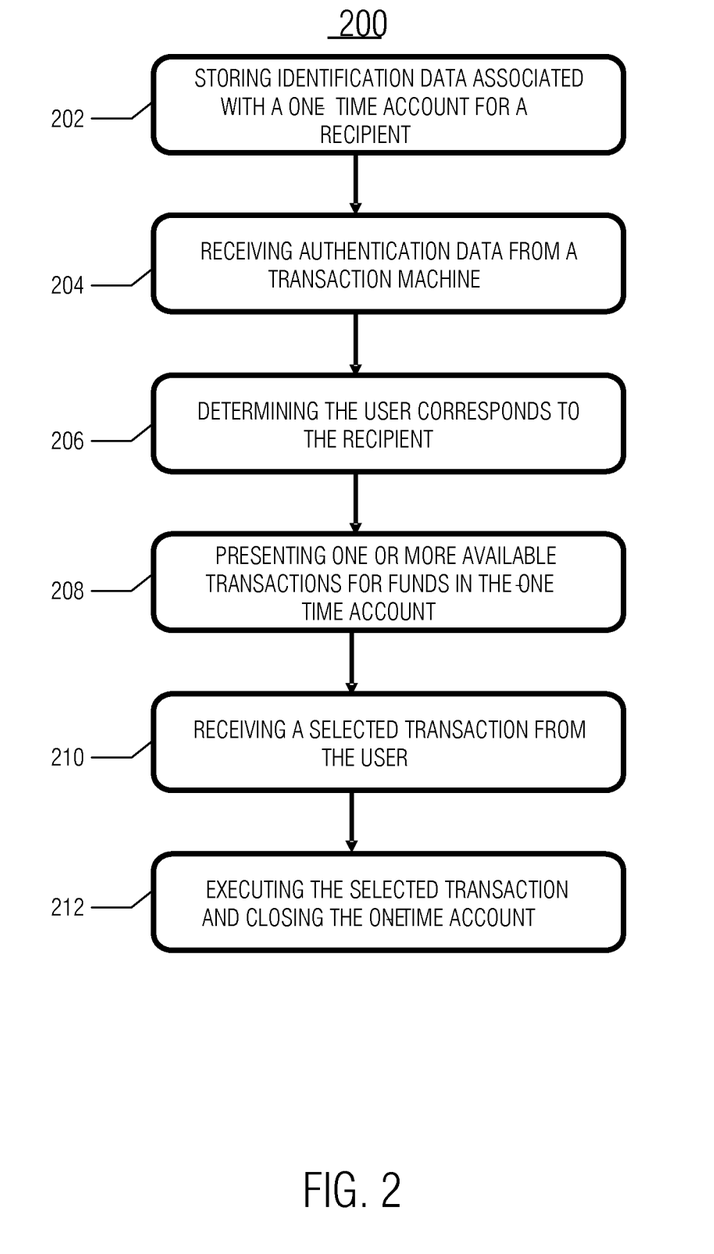
FIG. 2 illustrates a method to transfer funds, according to various examples.

FIG. 2 illustrates a method 200 to transfer funds using a one-time account, according to various examples. The use of a one-time account can, for example, be used to transfer funds from a customer to a recipient who does not have a bank account or who does not wish to share bank account information.

In block 202, the method can be begin by storing identification data associated with a one-time account and used to authenticate the recipient of the funds in the one-time account. Storing of this data can, for example, occur in response to receiving a request from the customer to create a one-time account for an amount of funds. In response to input from a customer, a transaction module can create a database entry for the one-time account and include in the entry the amount of funds, information associating the customer's main account to the one-time account, and identification data used to authenticate the recipient of the funds.

The identification data can, for example, include the name of the recipient or other data that is stored on a transaction card. However, as will be discussed below, the method 200 can include shared secret authentication in place of (or in addition to) authentication using a transaction card. A message can also be sent to the designated recipient providing a notification that a one-time account was created for him or her. This can be done, for example, by text or email using an address associated with the recipient.

In block 204, authentication data from a transaction machine is received. As noted above, the transaction machine can be any type of device that allows a user to execute a financial transaction. This includes ATMs and mobile devices such as phones and tablets, among other devices. The authentication data can, for example, include data stored on a transaction card such as, for example, the data on the magnetic stripe of a debit card, a credit card, an ATM card or a special purpose card. The ATM user can provide the data by swiping the transaction card through a card reader at the ATM or the transaction machine wirelessly communicating with the card (e.g., using NFC).

In block 206, the transaction module determines that the user of the transaction machine corresponds to the recipient of the one-time account using, for example, the previously-stored identification data and the authentication data received from the transaction machine. The transaction module can, for example, determine (e.g., by executing a database query) whether the name stored on the magnetic stripe of the transaction card matches a name stored in a one-time account database entry.

In block 208, the transaction module presents one or more available transactions for the funds in the one-time account. The transaction module can present on the user interface of the transaction machine one or more transaction options for the user to select. Example transaction types include cash withdrawal (e.g., where the transaction machine is an ATM), debit card loading, merchant payment, or account transfer which allows a recipient to transfer funds from the one-time account to another account for the recipient. The transaction module can, for example, present the one or more available transactions for the funds based on determining that the type of transaction machine being used.

In one example, the customer can input and the system can store the available transaction type(s) for the one-time fund during creation of the database entry for the one-time account, with the transaction module only presenting the stored type(s) as option(s) for the user. In other example, the transaction module can recognize the type of transaction machine and can customize the presentation of available transactions. For instance, the transaction module can identify a mobile application and not present a cash withdrawal option or can identify an ATM and present the option of cash withdrawal.

In block 210, the transaction module receives a selected transaction from the user. The user typically selects the desired transaction from the user interface of the transaction machine. The receipt of a selected transaction can include a user simply confirming a desired transaction. For example, a user interface of an ATM can present "Confirm cash withdrawal of $20 from your one-time account?" and receive input of the user's confirmation.

In block 212, the transaction module executes the selected transaction and closes the one-time account. Execution of the selected transaction can include the transaction module communicating with a currency dispenser on an ATM to dispense cash, communicating with an account management system to transfer funds from the one-time account to another account, or communicating with a card reader to load a debit card. The transaction module can close the one-time account in a number of ways. For example, a data field in a database entry for the one-time account can be added or updated to reflect a closed status or the entry can be deleted. The former way—using a status data field—provides a convenient way to audit the one-time account.

As mentioned above, the method 200 can include a transaction module using shared secret authentication instead of (or in addition to) authentication using a transaction card. Shared secret authentication can be provided using, e.g., information that is personally known to the customer and the recipient such as a password or code, a birthday, a picture or a social media entry. In other examples, shared secret authentication can be provided using a media file such as a picture or video clip taken by a camera associated with the transaction machine and subsequent approval by the customer (e.g., real-time or near real-time approval).

Consider shared secret authentication using a picture known by both the customer and the recipient. When the customer sets up a one-time account, the transaction module can for example receive a picture from the customer as identification data. When the user/recipient attempts to access the funds at a transaction machine, the transaction module can present to the user/recipient a group of pictures including the shared secret picture and receive as authentication data the selection of a picture from the group of related pictures. The transaction module can then determine that the user corresponds to the designated recipient by determining that the selected picture matches the shared secret picture.

To determine the group of pictures to present to the user/recipient at the transaction machine, the transaction module, e.g., at the time the customer sets up the one-time account, can determine a category associated with the particular shared picture (e.g., person, place, etc.) and determine a group of related pictures based on the category associated with the particular picture. The transaction module can access server systems such as picture databases to obtain pictures of the same type as the shared secret picture.

Consider shared secret authentication using a social media entry (e.g., a social media link, profile or picture) of the designated recipient. When the customer sets up a one-time account, the transaction module can for example receive a social media entry of the designated recipient as identification data. When the user/recipient attempts to access the funds at a transaction machine, the transaction module can present to the user a group of social media entries including the user's social media entry and receive as authentication data the selection of a particular entry from the group of entries. The transaction module can then determine that the user corresponds to the designated recipient by determining that the selected social media entry matches the social media entry of the designated recipient.

To determine the group of social media entries to present to the user/recipient at the transaction machine, the transaction module, e.g., at the time the customer sets up the one-time account, can determine a group of social media entries based on a type of the particular social media entry. For example, the transaction module can receive from a customer the selection of a picture or profile from a social media database or contact list. The transaction module can access a social media server system to obtain links to picture or profiles from the same social media system.

As another alternative, shared secret authentication can include the transaction module receiving identification data that indicates a customer approval authentication process. To authenticate the user, the transaction module can present a screen to the user prompting the user to provide a media clip (e.g., picture or video) as authentication data using a camera associated with the transaction machine. The transaction module can then determine that the user corresponds to the designated recipient by sending the media clip to the customer and receiving an indication from the customer that the user corresponds to the designated recipient. The media clip can be sent to a customer device (e.g., computer or mobile device) by email or text or to an application running on the customer device, for example.

The method 200 can further include the transaction module sending an email or other notification to the designated recipient with a link or other actionable item associated with the one-time account. Upon selection of the link or actionable item, the transaction module can present a display or a web page prompting the recipient to authenticate himself or herself. This can include displaying a group of pictures or social media entries and prompting the user to select a particular entry from among the group. In another example, this can include prompting the user to take a picture or capture a video clip with his or her device (e.g., mobile phone or tablet) which is then sent to the customer who initiated the one-time account to indicate whether the user is the intended recipient. The method 200 can further include a transaction module presenting (e.g., using a mobile application on a mobile device) a hyperlink as one or more of the available transaction. The hyperlink can, for example, be used as a form of payment, such as at a merchant.

Figure 3:
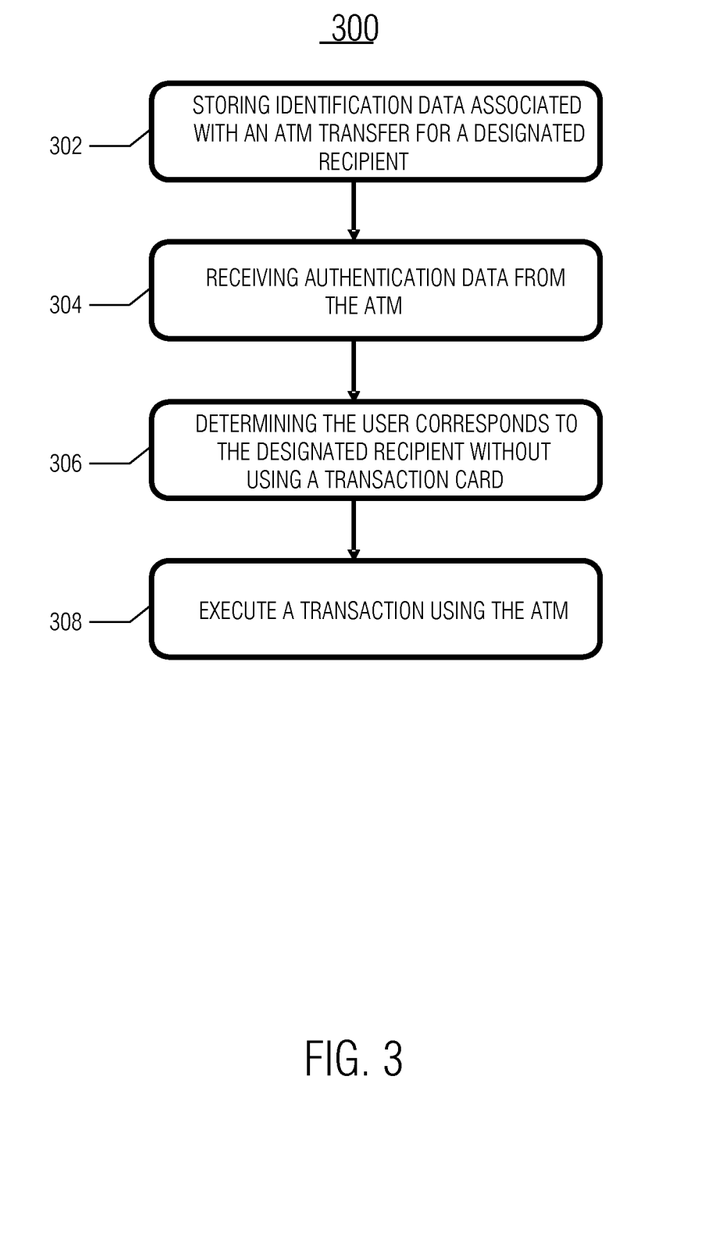
FIG. 3 illustrates a method to transfer funds, according to various examples.

FIG. 3 illustrates a method 300 making a cash withdrawal from an ATM without the use of a transaction card such as an ATM or debit card, according to various examples. At 302, the method begins with a transaction module storing, in a database, the amount of funds for a transfer to a designated recipient and identification data associated with the transfer. The identification data includes data that is different than data commonly found on transaction cards. For example, as discussed above, the identification data can include a picture uploaded from a user, a picture selected from a social media entry, a password such as a mobile phone number or birthday or a random password, or data indicating a customer approval process. The transaction module can store the identification data and other data for the transfer in response to a customer requesting to establish a transfer of funds to the recipient.

At 302, the transaction module receives authentication data from a user of the ATM. The authentication data includes data different than data stored on transaction cards. For example, as discussed above, the authentication data can include a selection of a picture from a group of pictures, the receipt of a password or a media clip such as a video clip or picture of the user taken at the ATM. At 304, the transaction module determines that the user corresponds to the designated recipient using the received authentication data and the stored identification data. As discussed above, this can include, for example, comparing a selected picture or an received password against a picture or password stored as identification data. Where the identification data indicates customer approval, this can include sending a media clip of the user to the customer and receiving notification from the customer that the user corresponds to the designated recipient.

At 306, after determining the user corresponds to the designated recipient, the transaction module can execute the transaction using the ATM. This can, for example, include dispensing cash funds to the user, loading a debit card or transferring funds to an account designated by the user. In this manner, a customer can provide funds to a recipient using an ATM without the recipient having to use a transaction card. This can provide a secure and convenient way to provide cash funds to a recipient (such as a child or a person outside of the country) who does not have a transaction card. The method 300 can further use one or more rules related to a particular transaction time and a particular ATM for the transfer as discussed above.

In the methods described above, rules that governing the transactions can be set by the customer and received by the transaction module, e.g., during creation of a one-time account or upon receiving a request from a customer to transfer funds. The transaction module can prompt a user to select one or more of these rules and then store the rule in a database for later query. The methods can further include, prior to executing a transaction, the transaction module determining whether the transaction satisfies one or more rules for the transaction.

Rules can, for example, be set that govern the time at which a transaction can occur and the location or machine that handles the transaction. The transaction module can determine that receipt of the authentication data or the requested transaction occurs at a particular time and from a particular location or device using the rules, prior to executing a transaction. This can provide the customer with more control over the transaction and offer another layer of security.

In the case of an ATM, a customer can request that a particular ATM be used for the transaction. The transaction module can then for example present the customer with a number of ATMs in the vicinity of an inputted zip code or other geographic input (e.g., GPS or Wi-Fi signal) and the customer can select the ATM for the transaction. An identifier of the selected ATM can then be stored in a database. At the time of a transfer, the transaction module can then receive at least one of a time stamp and an ATM identifier (e.g., MAC address) from the ATM and determine that the time stamp and/or the ATM identifier satisfies the one or more rules related to a particular transaction time and a particular ATM for the transfer prior to executing the transaction. With other transaction machines such as mobile devices, the mobile device can send the transaction module its MAC address and a time-stamp so the transaction module can determine whether the customer's rules have been met.

Rules can be set that define a particular merchant or merchants where the funds can be used and/or a category of goods (including services) for the funds. At the time of a transaction, the transaction module can determine (e.g., by a database query) that the transaction corresponds to a particular category of goods or merchant prior to executing the selected transaction. For example, a user/recipient can select a payment to a particular merchant and the transaction module can determine whether the merchant meets the rules established by the customer relating to a particular merchants or type of merchants, or goods associated with the selected merchant.

The example systems described herein can allow for a number of use cases. As one example, the systems can be used for payroll check distribution where a business customer can provide electronic distribution of payroll funds to its employees that do not have a primary bank account or do not wish to share their account information for direct deposit. The business customer or a banker on behalf of the customer can use a transaction module to create one-time accounts to be accessed by the employees from an ATM. The example systems can allow the employees to establish their identities and access their funds using, for example, the card reader at an ATM and a transaction card such as a credit card, an ATM card or special payroll debit card.

As another example, the systems can be used to provide funds such as allowances to recipients such as family and friends. The transaction module can, for example, allow a customer such as a parent to create a one-time account to be accessed by a child from an ATM. The child recipient can establish his or her identity and access his or her funds using, for example, the card reader at the ATM and a transaction card such as a credit card, an ATM card or special payroll debit card. One-time accounts can be used to provide funds to a friend who can be watching a customer's children or running an errand for a customer or to provide funds to a customer's parents to provide them with a fixed amount of cash for spending each month.

The example systems allow for time and location based ATM transfer of funds. For example, the transaction module can present a map of ATMs to a customer and receive from a customer a selection of a particular ATM at which a transaction is valid and/or the transaction module can receive from the customer a time period during which a transaction is valid. The transaction module can further receive from the customer the transfer recipient's phone number. The customer can communicate this information to the recipient (e.g., "go to the ATM at Battery and California between 2 and 3 PM, select 'GetCash from Bank Customer' then enter your mobile phone number" Recipient can retrieve cash from that ATM during that time period upon entry of the mobile phone number.

As another example, a transaction module can receive location and/or time rules for an ATM transfer as above and can store a secret picture, which the customer communicates to the recipient. The transaction module can display the secret picture along with a number of other images and require the user of the ATM to select the valid picture to authenticate himself or herself. As an alternative, the transaction module can integrate with social media, allowing the customer to select a photo of a person in their social media contacts. The transaction module can then display at the ATM a collage of people, requiring the user of the ATM to select his or her own photo to retrieve the cash from the ATM.

As another example, a transaction module can receive location and/or time rules for an ATM transfer as above and can store as identification data a customer approval request. The customer can inform the designated recipient that his or her photo will be taken at the ATM and verified by the customer to authenticate the user as the designated recipient. In this example, to retrieve cash from the ATM, the user has his or her photo taken at the ATM and the transaction module sends a push notification to the customer's device. The customer can then open the push notification, and receive from the transaction module a picture of the person attempting to withdraw funds. The customer can then send a message back to the transaction module approving or rejecting the transfer.

Figure 4:
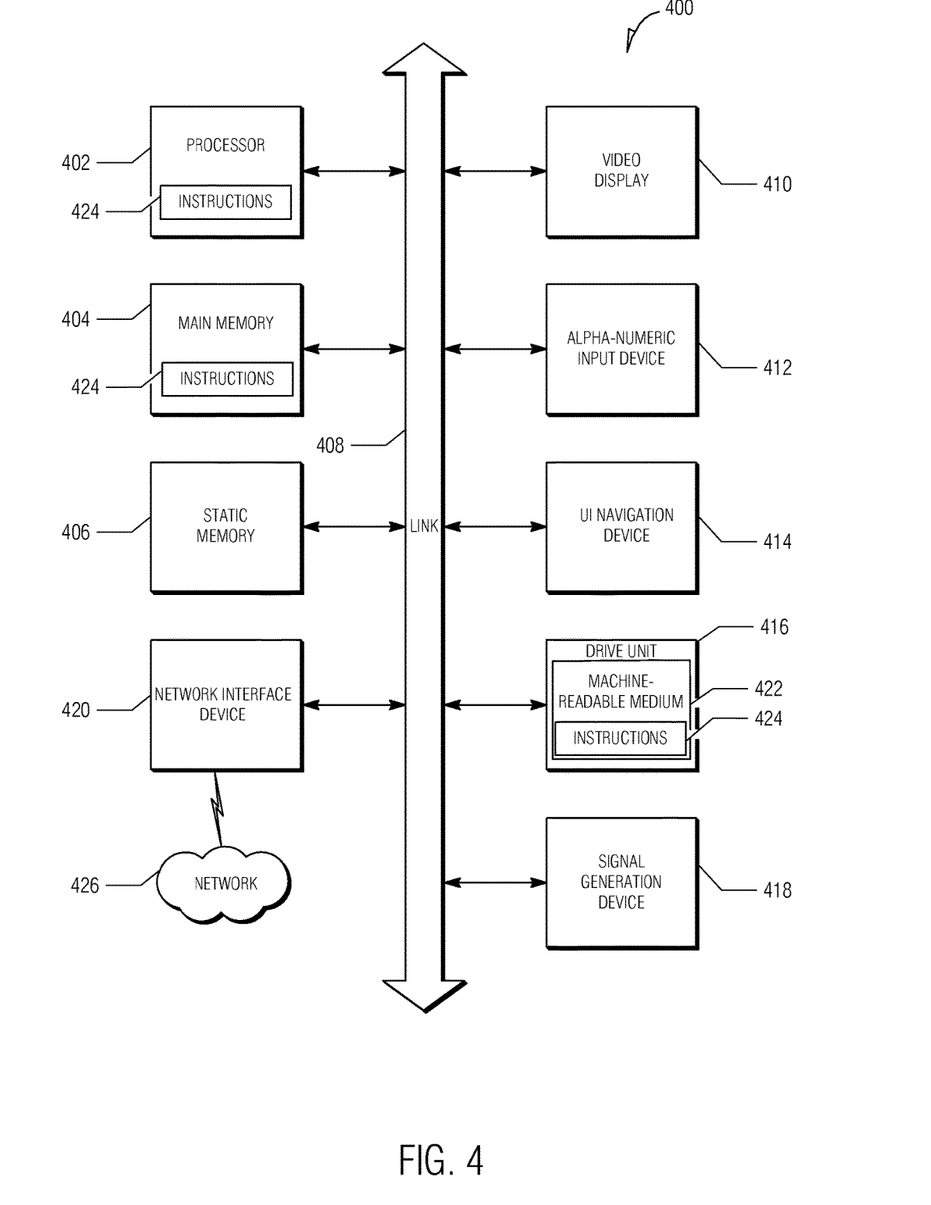
FIG. 4 is a block diagram of a machine in the example form of a computer system within which a set of instructions, for causing the machine to perform any one or more of the methodologies discussed herein, can be executed.

FIG. 4 is a block diagram illustrating a machine in the example form of a computer system 400, within which a set or sequence of instructions can be executed to cause the machine to perform any one of the methodologies discussed herein, according to an example embodiment. In alternative embodiments, the machine operates as a standalone device or can be connected (e.g., networked) to other machines. In a networked deployment, the machine can operate in the capacity of either a server or a client machine in server-client network environments, or it can act as a peer machine in peer-to-peer (or distributed) network environments. The machine can be a personal computer (PC), a tablet PC, a hybrid tablet, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 400 includes at least one processor 402 (e.g., a central processing unit (CPU), a graphics processing unit (GPU) or both, processor cores, compute nodes, etc.), a main memory 404 and a static memory 406, which communicate with each other via a link 408 (e.g., bus). The computer system 400 can further include a video display unit 410, an alphanumeric input device 412 (e.g., a keyboard), and a user interface (UI) navigation device 414 (e.g., a mouse). In one embodiment, the video display unit 410, input device 412 and UI navigation device 414 are incorporated into a touch screen display. The computer system 400 can additionally include a storage device 416 (e.g., a drive unit), a signal generation device 418 (e.g., a speaker), a network interface device 420, and one or more sensors (not shown), such as a global positioning system (GPS) sensor, compass, accelerometer, or other sensor.

The storage device 416 includes a machine-readable medium 422 on which is stored one or more sets of data structures and instructions 424 (e.g., software) embodying or utilized by any one or more of the methodologies or functions described herein. The instructions 424 can also reside, completely or at least partially, within the main memory 404, static memory 406, and/or within the processor 402 during execution thereof by the computer system 400, with the main memory 404, static memory 406, and the processor 402 also constituting machine-readable media.

While the machine-readable medium 422 is illustrated in an example embodiment to be a single medium, the term "machine-readable medium" can include a single medium or multiple media (e.g., a centralized or distributed database, and/or associated caches and servers) that store the one or more instructions 424. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 424 can further be transmitted or received over a communications network 426 using a transmission medium via the network interface device 420 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above description is intended to be illustrative, and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims can not set forth every feature disclosed herein as embodiments can feature a subset of said features. Further, embodiments can include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A method for transferring funds from a customer to a designated recipient using a one-time account and a transaction machine, the method comprising:
   storing, in a database, identification data associated with a one-time account for the designated recipient of the one-time account and an amount of funds in the one-time account, the one-time account being different from a main account of the designated recipient and different from a main account of the customer, the identification data including a particular social media entry for the designated recipient;
   receiving authentication data from the transaction machine, the authentication data containing information pertaining to a user of the transaction machine, the authentication data including a selection of a social media entry from a group of social media entries;
   determining that the user corresponds to the designated recipient using the received authentication data and the stored identification data, the determining comprising determining that the selected social media entry matches the particular social media entry;
   based on the determination that the user corresponds to the designated recipient, presenting one or more available transactions for the funds in the one-time account;
   receiving a selection of a transaction from the one or more available transactions; and
   executing the selected transaction and closing the one-time account after executing the requested transaction.

2. The method of claim 1, further including:
   storing, in the database, one or more rules related to transaction time and transaction location or device; and
   determining, prior to executing the selected transaction, that receipt of the authentication data occurs at one or more of a particular time and from a particular location or device using the one or more rules.

3. The method of claim 1, further including storing, in the database, one or more transaction types for the one-time account, the one or more transaction types including cash withdrawal, debit card loading, merchant payment or account transfer.

4. The method of claim 1, wherein the identification data includes a data indicating a customer approval request, and wherein the received authentication data includes a media clip of the user taken at the transaction machine, wherein determining that the user corresponds to the designated recipient includes sending the media clip to the customer and receiving an indication from the customer that the user corresponds to the designated recipient.

5. The method of claim 1, further including storing an identifier for a particular transaction machine and a particular time period, wherein presenting the one or more available transactions for the funds is also based on determining that the transaction machine is the particular transaction machine and that the authentication data was received at a time corresponding to the particular time period.

6. The method of claim 1, wherein the identification data includes a particular picture, wherein the received authentication data includes a selection of a picture from a group of related pictures, and wherein determining that the user corresponds to the designated recipient includes determining that the selected picture matches the particular picture.

7. The method of claim 1, further receiving a request from the customer to transfer the amount of funds to the designated recipient from the customer main account and wherein storing further includes, responsive the receipt of the request, creating the one-time account for the transfer and associating the one-time account with the customer main account.

8. The method of claim 1, wherein storing further includes storing a particular class of goods or merchants associated with the funds, wherein the method further includes determining that the selected transaction corresponds to the stored class of goods or merchants prior to executing the selected transaction.

9. The method of claim 1, wherein the transaction machine is a mobile device with a mobile application and wherein presenting includes using the mobile application to present a hyperlink as a form of payment to a merchant.

10. The method of claim 1, wherein the stored identification data includes data stored on a transaction card.

11. The method of claim 1, wherein the stored identification data includes customer-provided data that is not data stored on a transaction card.

12. A non-transitory computer-readable storage medium, the computer-readable storage medium including instructions that when executed by a computer, cause the computer to perform operations of:
storing, in a database, identification data associated with a one-time account for a designated recipient of the one-time account and an amount of funds in the one-time account, the one-time account being different from a main account of the designated recipient and different from a main account of a customer establishing the one-time account, the identification data including a particular social media entry for the designated recipient;
receiving authentication data from a transaction machine, the authentication data containing information pertaining to a user of the transaction machine, the authentication data including a selection of a social media entry from a group of social media entries;
determining that the user corresponds to the designated recipient using the received authentication data and the stored identification data, the determining comprising determining that the selected social media entry matches the particular social media entry;
based on the determination that the user corresponds to the designated recipient, presenting one or more available transactions for the funds in the one-time account;
receiving a selection of a transaction from the one or more available transactions; and
executing the selected transaction and closing the one-time account after executing the requested transaction.

13. The computer-readable storage medium of claim 12, wherein the stored identification data includes customer-provided data that is not data stored on a transaction card, wherein the operations further include:
determining that the user corresponds to the designated recipient without using a transaction card;
storing, in the database, one or more rules related to transaction time and transaction location or device; and
determining, prior to executing the selected transaction, that receipt of the authentication data occurs at one or more of a particular time and from a particular location or device using the one or more rules.

14. A system comprising:
a processor; and
a memory storing instructions that, when executed by the processor, configure the processor to:
store, in a database, identification data associated with a one-time account for a designated recipient of the one-time account and an amount of funds in the one-time account, the one-time account being different from a main account of the designated recipient and different from a main account of a customer establishing the one-time account, the identification data including a particular social media entry for the designated recipient;
receive authentication data from a transaction machine, the authentication data containing information pertaining to a user of the transaction machine, the authentication data including a selection of a social media entry from a group of social media entries;
determine that the user corresponds to the designated recipient using the received authentication data and the stored identification data, the determining comprising determining that the selected social media entry matches the particular social media entry;
based on the determination that the user corresponds to the designated recipient, present one or more available transactions for the funds in the one-time account;
receive a selection of a transaction from the one or more available transactions; and
execute the selected transaction and closing the one-time account after executing the requested transaction.

* * * * *

UNITED STATES PATENT AND TRADEMARK OFFICE
CERTIFICATE OF CORRECTION

| | | |
|---|---|---|
| PATENT NO. | : 10,255,589 B1 | Page 1 of 1 |
| APPLICATION NO. | : 14/921173 | |
| DATED | : April 9, 2019 | |
| INVENTOR(S) | : Petruzzi et al. | |

It is certified that error appears in the above-identified patent and that said Letters Patent is hereby corrected as shown below:

In the Claims

In Column 11, Line 25, in Claim 7, after "responsive", insert --to--

Signed and Sealed this
Fourteenth Day of April, 2020

Andrei Iancu
*Director of the United States Patent and Trademark Office*